United States Patent
Kang et al.

(10) Patent No.: US 7,321,552 B2
(45) Date of Patent: Jan. 22, 2008

(54) WIRELESS COMMUNICATION APPARATUS, WIRELESS COMMUNICATION SYSTEM EMPLOYING THE SAME AND CONTROL METHOD THEREOF

(75) Inventors: Hyun-sook Kang, Kyungki-do (KR); Tae-jin Lee, Kyungki-do (KR); Jong-hun Park, Kyungki-do (KR); Kyung-hun Jang, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 905 days.

(21) Appl. No.: 10/040,632

(22) Filed: Jan. 9, 2002

(65) Prior Publication Data

US 2002/0101849 A1 Aug. 1, 2002

(30) Foreign Application Priority Data

Jan. 30, 2001 (KR) ................................. 2001-4294

(51) Int. Cl.
*G06F 11/00* (2006.01)
*H04B 7/212* (2006.01)

(52) U.S. Cl. ..................... 370/230; 370/338; 370/345

(58) Field of Classification Search ................ 370/328, 370/329, 345, 347, 406, 230–236, 349, 458, 370/335–338, 442, 395.53
See application file for complete search history.

(56) References Cited

U.S. PATENT DOCUMENTS 5,461,608 A * 10/1995 Yoshiyama ................. 370/222
6,657,987 B1 * 12/2003 Kumar et al. ............... 370/346
6,754,250 B2 * 6/2004 Haartsen ..................... 375/132
2001/0002906 A1 * 6/2001 Rune .......................... 370/345

FOREIGN PATENT DOCUMENTS

JP      62-194757 A      8/1987
KR   10-2001-0004954    * 1/2001

OTHER PUBLICATIONS

W. Zhang, et al.; "On Improving the Performance of Bluetooth Networks" May 2001; pp. 1-16; XP002198269.
"Specification of the Bluetooth System; Wireless connections made easy; Core; vl. OB" Bluetooth Specification Version, XX, XX, Dec. 1, 1999; pp. 1, 95-126, XP002173220.

* cited by examiner

*Primary Examiner*—Afsar Qureshi
(74) *Attorney, Agent, or Firm*—Sughrue Mion, PLLC

(57) ABSTRACT

A wireless communication apparatus, a wireless communication system employing the same and a control method thereof. When the wireless communication apparatus is operated as a master device, the wireless communication apparatus includes a transceiving unit for receiving and transmitting data externally, and a controller for analyzing a destination of a packet received for a certain period of time, detecting an amount of slot usage according to the destination, selecting a temporary master device according to the amount of slot usage, and transferring role of a master to the selected temporary master device. Accordingly, wireless sources can be efficiently used, and at the same time, peer-to-peer communication can be carried out among devices acting as slaves.

18 Claims, 4 Drawing Sheets

FIG.6

| DEVICE | NUMBER OF USING SLOT |
|---|---|
| M10 | 5 |
| S10 | 30 |
| S20 | 20 |
| S30 | 10 |
| S40 | 5 |

WIRELESS COMMUNICATION APPARATUS, WIRELESS COMMUNICATION SYSTEM EMPLOYING THE SAME AND CONTROL METHOD THEREOF

BACKGROUND OF THE INVENTION

1. Field of the Invention

The present invention relates to a wireless communication apparatus, a wireless communication system employing the same and a control method thereof that uses a slot efficiently and enables communication between slave devices by selecting a temporary master device according to an amount of slot usage in the wireless communication apparatuses that are connected to the wireless communication system.

2. Description of the Related Art

FIG. 1 shows the structure of a Piconet in a typical Bluetooth communication system.

Referring to FIG. 1, the Bluetooth communication system has a plurality of slave devices S10, S20, S30 and S40 connected to one master device M10. Such a network, i.e., a network in which at least one slave device such as S10, S20, S30 and S40, is connected to one master M10, is called a Piconet. In the Piconet, a maximum of seven slave devices in an active state can be connected to the master device M10.

In the Piconet, the master device M10 and the slave devices S10, S20, S30 and S40 communicate through packets. FIG. 2(a) shows the structure of a conventional packet which is transmitted in the Piconet shown in FIG. 1, and FIG. 2(b) shows a header portion of the packet of FIG. 1 in greater detail.

The current Bluetooth communication method employs a master driven TDD (Time Division Duplex) type, system in which the master device transmits a packet designating a specific slave device, from a group of slave devices. The specific slave device subsequently transmits a data recorded packet to the master device as a response. Since the communication is carried out only between the specific slave device and the master device, the other slave devices cannot communicate with each other.

Therefore, several methods have been proposed to enable inter-slave communication, namely, peer-to-peer communication between slave devices.

One conventional method is a master-slave switching method. This method is performed between the master device and the slave device such that one of the slave devices acts as the master device thereby enabling communication with the other slave devices.

Another method is a destination address recording method, in which an address of a destination slave to which the packet should be finally sent, is recorded in an AM_ADDR (Active Member Address) part of the packet header area, and an address of a slave device which transmits the packet is recorded in a payload area of the packet.

FIG. 3 shows an example of the packet according to the destination address recording method. When one slave device sends an address of another slave device, desired for communication as recorded in the destination address, the master device analyzes the destination address of the received packet and transmits the packet to the corresponding destination. Accordingly, peer-to-peer communication is performed among the slave devices, albeit via the master device.

According to the destination address recording method, the master device analyzes and sends the received packets to the destination slaves every time the master device receives the packets. However, because communication among the slave devices is frequently carried out this method of slave to slave communication is time consuming and it wastes packets. This is because the destination address recording method requires more packets than are required for the communication between the slave and master devices.

SUMMARY OF THE INVENTION

The present invention is proposed to improve the foregoing problems associated with peer-to peer communication. It is, therefore, an object of the present invention to provide a wireless communication apparatus capable of supporting peer-to-peer communication according to an amount of slot usage of a packet which is transmitted or received.

The above object is accomplished by a wireless communication apparatus according to a preferred embodiment of the present invention. The apparatus includes a transceiving unit for receiving and transmitting data externally and a controller for analyzing a destination of a packet received for a certain period of time, detecting an amount of slot usage according to the destination, selecting a temporary master device according to the amount of slot usage, and transferring a role of master to the selected temporary master device. Accordingly, the wireless communication apparatus is operated as a master device.

Preferably, the controller selects the master device that corresponds to the destination having the largest amount of slot usage.

Further, the controller maintains the role of master for a certain period of time if the controller is the device having the largest amount of slot usage.

The above object is also accomplished by a wireless communication system according to a preferred embodiment of the present invention. The system includes a master device for analyzing a destination of a packet received for a certain period of time, detecting an amount of slot usage according to the destination, selecting a temporary master device according to the amount of slot usage, and transferring a role of a master to the selected temporary master device. There is at least one slave device connected with the master device. If a slave device is selected as the temporary master device, the selected slave device takes the role of the master from the master device and acts as the temporary master device for a given period of time.

Further, the above object is also accomplished by a control method of a wireless communication system having a master device and at least one slave device connected with the master device according to a preferred embodiment of the present invention. The method includes the steps of (a) the master device, analyzing a packet received for a certain period and detecting an amount of slot usage according to a destination; and (b) the master device, selecting a temporary master device according to the amount of slot usage and transferring a role of master to the selected temporary master device.

BRIEF DESCRIPTION OF THE DRAWINGS

FIG. 6 shows an example of a memory of FIG. 4.

DETAILED DESCRIPTION OF THE PREFERRED EMBODIMENT

Hereinafter a preferred embodiment of the invention will be described through a wireless communication apparatus employing a Bluetooth communication method.

Figure 1:
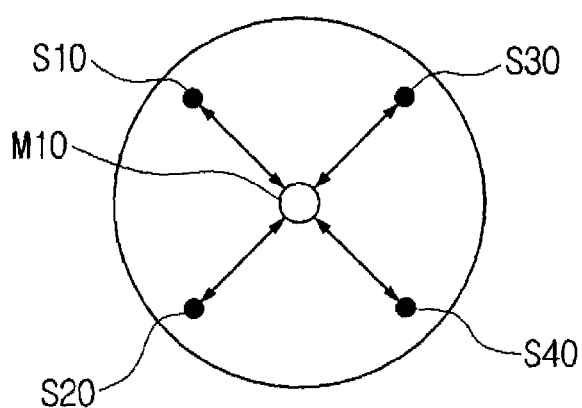
FIG. 1 shows the structure of a Piconet in a conventional Bluetooth communication system.
Figure 2:
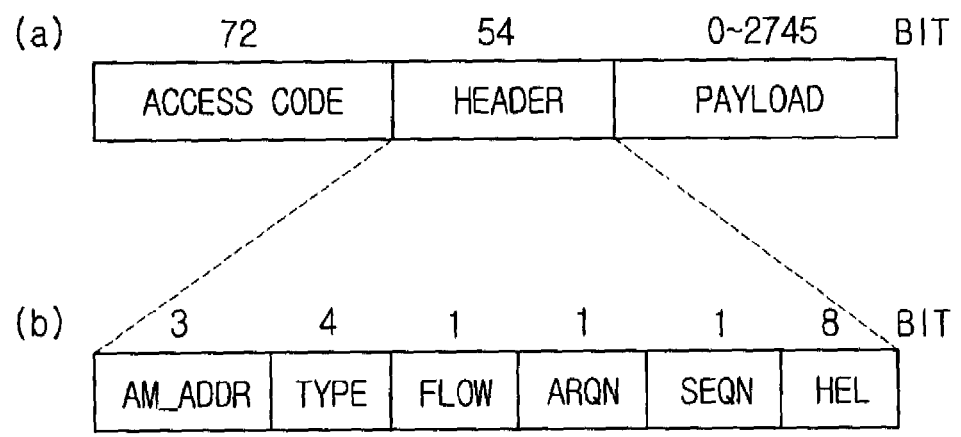
FIG. 2(a) shows the structure of a conventional packet which is transmitted in the Piconet of FIG. 1.
FIG. 2(b) shows a header area of FIG. 1 in greater detail.
Figure 3:
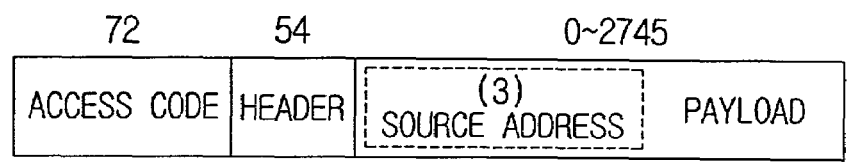
FIG. 3 shows the structure of a packet according to a destination address recording method.
Figure 4:
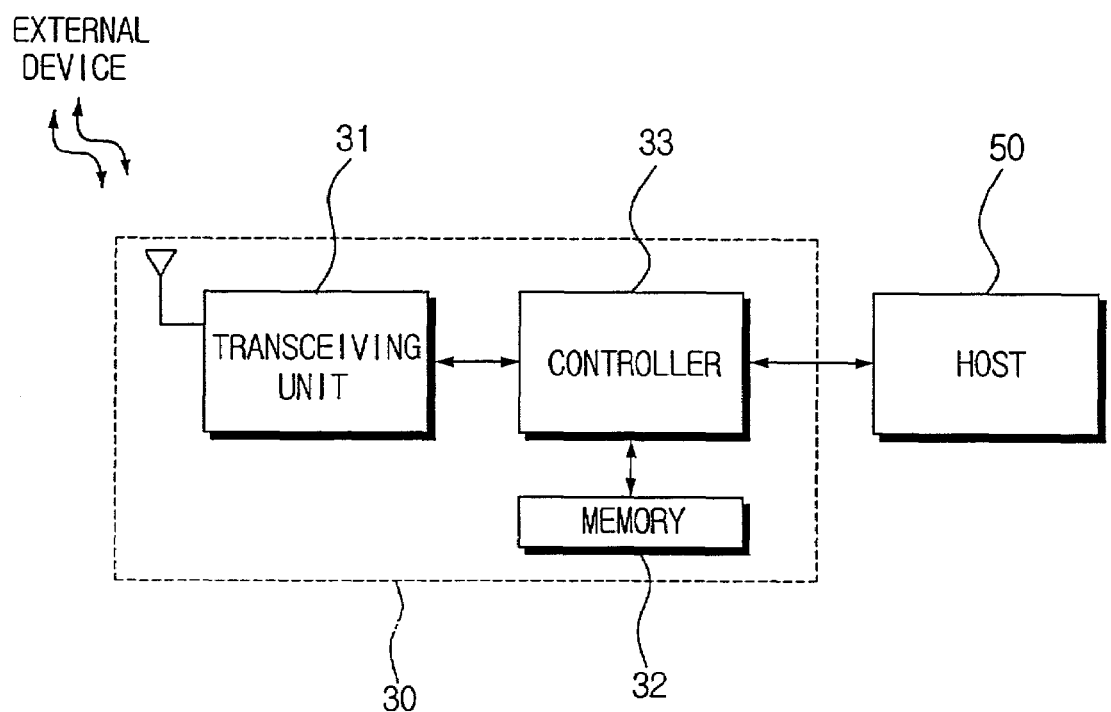
FIG. 4 is a block diagram for showing a wireless communication apparatus according to the invention.

FIG. 4 is a block diagram f showing a wireless communication apparatus according to a preferred embodiment of the present invention.

Referring to FIG. 4, the wireless communication apparatus designated by 30 has a transceiving unit 31, a memory 32 and a controller 33.

The transceiving unit 31 processes a received signal such as an RF (Radio Frequency) signal and sends a transmission-intended packet to the outside.

Memory 32 stores an amount of slot usage of the wireless communication apparatus connected to a Piconet. FIG. 6 shows an example of the memory shown in FIG. 4.

Controller 33 is connected with host 50 through a communication interface. Here, the host 50 can be various communication terminals such as a notebook computer, a mobile telephone, a printer, or the like.

The controller 33 processes a signal requested from the host 50, and a signal received via the transceiving unit 31.

Also, the controller 33 stores an amount of slot usage of the slave devices corresponding to a destination, which is recorded in the packet received in the memory 32 via the transceiving unit 31 during one master-slave switching period. The controller selects the device having the largest amount of slot usage as a temporary master device.

The controller 33 performs a mutual master-slave switching to transfer a role of a master to the selected temporary master device. Accordingly, the temporary master device acts as the master device during the next master-slave switching period.

Here, controller 33 continuously acts as the master device for a certain period of time if controller 33 is determined to be the one that has the largest amount of slot usage and is thus, selected as the temporary master device.

Figure 5:
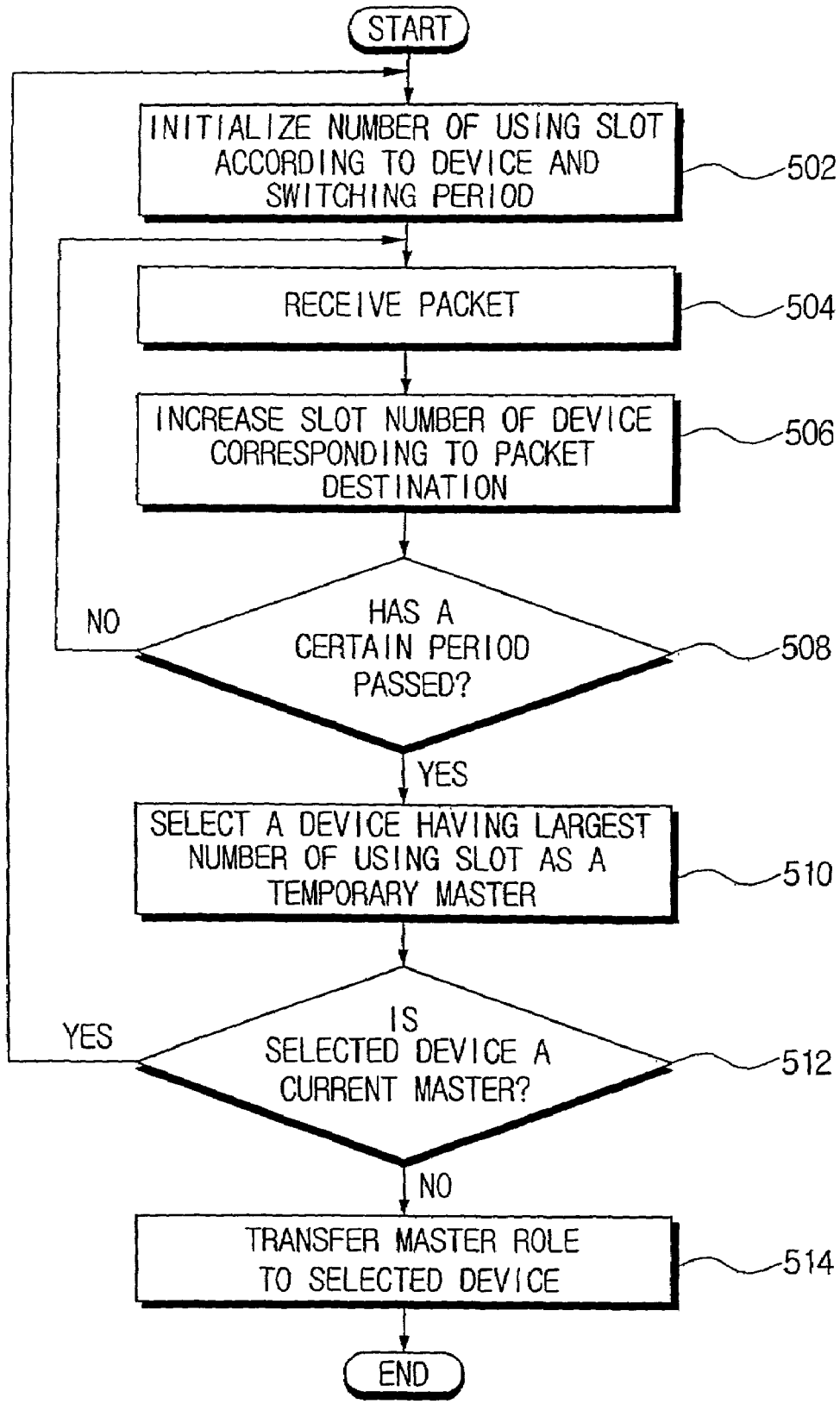
FIG. 5 is a flow chart for showing a process of selecting a temporary master when the wireless communication apparatus of FIG. 4 acts as a master.

FIG. 5 illustrates a process of selecting the temporary master device in accordance with the present invention. The wireless communication apparatus 30, acting as the master, is applied to the Piconet to which a number of wireless communication apparatuses are connected.

In step 502, the wireless communication apparatus 30 initializes the number of slot usage according to the devices and the switching period. Here, the master-slave switching period is a time for a mutual switching between the master device and the slave device, which is checked as the wireless communication apparatus 30 starts to send/receive packets to/from other wireless communication apparatuses connected therewith.

The wireless communication apparatus 30 acting as the master receives packets from the slave devices connected to the Piconet (step 504), and increases the number of slot for the wireless communication apparatuses (including itself) connected to the Piconet according to the destination recorded in the packet (step 506).

Here, the packet has a different number of slots according to the type of the packet. In other words, DM1, DM3 and DM5 packets use 1, 3 and 5 slots, respectively.

For example, if the DM3 packet is received and the address of the master is recorded in the destination address of the packet, three (3) slots are accumulated in a master (M10) item of the memory 32.

Also, if the DM1 packet is received and the address of slave 1 is recorded in the destination address of the packet, one (1) slot is accumulated in slave 1 (S10) item of the memory.

Then, if the switching period ends as the wireless communication apparatuses mutually send/receive the packets (step 508), one device having the largest number of slot usage is detected from the memory and selected as the temporary master device (step 510).

In step 512, it is determined whether or not the device selected as the temporary master is the current master.

If the device selected as the temporary master is not the current master, the master device and the device selected as the temporary master perform the master-slave switching to transfer the role of master to the device selected as the temporary master (step 514).

However, if the master selected as the temporary master is the current master, the foregoing steps are repeated.

According to the wireless communication system employing such a wireless communication apparatus and the method thereof, the slot number is calculated according to the device, and the role of master is transferred to the device having the largest slot number. Accordingly, the peer-to-peer communication can be carried out among the devices acting as the slave, and at the same time, the wireless source can be efficiently used.

It is apparent that the present invention is not restricted to the foregoing embodiment and can be modified without departing from the spirit of the invention by those skilled in the art. Therefore, the scope of the invention is not limited to the scope of the detailed description, but will be defined by the following claims.

What is claimed is:

1. A wireless communication apparatus comprising:
   a transceiving unit for receiving and transmitting data; and
   a controller,
   wherein the controller analyzes a destination of a packet received for a certain period of time, detects an amount of slot usage according to the destination and increases a number of slot usage in a destination device based on the packet destination, selects a temporary master device according to the amount of slot usage, and transfers a role of master to the selected temporary master device.

2. The wireless communication apparatus of claim 1, comprising a memory for storing the amount of slot usage of the wireless communication apparatus.

3. The wireless communication apparatus of claim 1, wherein the wireless communication apparatus is operated as a master device.

4. The wireless communication apparatus of claim 1, wherein the controller selects the temporary master device that corresponds to the destination having the largest amount of slot usage.

5. A wireless communication apparatus of claim 1, wherein the controller continuously acts as a master device for a certain period of time if the controller has the largest amount of slot usage.

6. The wireless communication apparatus of claim 1, wherein the controller is connected to a host via a communication interface.

7. A wireless communication system comprising:
a master device for analyzing a destination of a packet, detecting an amount of slot usage according to the destination and increasing a number of slot usage in a destination device based on the packet destination, selecting a temporary master device according to the amount of slot usage, and transferring a role of master to the selected temporary master device; and
at least one slave device connected with the master device, wherein if the at least one slave device is selected as the temporary master device, the at least one slave device takes the role of master from the master device and acts as the temporary master device for a predetermined period of time.

8. The wireless communication system of claim 7, wherein the master device selects the temporary master device that corresponds to a destination having the largest amount of slot usage.

9. The wireless communication system of claim 7, wherein the master device continuously maintains the role of master device for the predetermined period of time if the master device is the device that has the largest amount of slot usage.

10. A control method of a wireless communication system having a master device and at least one slave device connected with the master device, the method comprising:
the master device, analyzing a packet received for a period of time and detecting an amount of slot usage according to a destination;
the master device increasing a number of slot usage in a destination device based on the packet destination; and
the master device, selecting a temporary master device according to the amount of slot usage and transferring a role of master to the selected temporary master device.

11. The control method of claim 10, wherein the selecting a temporary master further comprises selecting the temporary master device that corresponds to a destination having the largest amount of slot usage.

12. The control method of claim 10, wherein the master device continuously maintains the role of master device for a certain period of time if the master device is the device that has the largest amount of slot usage.

13. A control method of a wireless communication system having a master device and at least one slave device connected with the master device, the method including:
the master device analyzing a packet received for a period of time and detecting an amount of slot usage according to a destination;
the master device increasing a number of slot usage in a destination device based on the packet destination; and
the master device selecting a temporary master device according to the amount of slot usage and transferring a role of master to the selected temporary master device.

14. The control method of claim 13, wherein the master device selecting a temporary master further comprises selecting the temporary master device that corresponds to a destination having the largest amount of slot usage.

15. The control method of claim 13, wherein the master device is operable to continuously maintain the role of master for said period of time if the master device is the device that has the largest amount of slot usage.

16. A wireless communication method for selecting a temporary master device, the wireless communication method comprising the steps of:
(a) initializing a number of slot usage according to slave devices and a switching period;
(b) receiving a packet from the slave devices connected to a Piconet, and increasing the number of slot usage according to a destination recorded in the packet;
(c) determining whether or not a switching period has passed as wireless communication apparatuses mutually send/receive a plurality of packets;
(d) selecting a certain device which has the largest number of slot usage and making the certain device a temporary master device; and
(e) determining whether or not the certain device, selected to be the temporary master device, is a current master.

17. The wireless communication method of claim 16, wherein if it is determined that the certain device selected to be the temporary master device is a current master, steps (a) through (e) are repeated.

18. The wireless communication method of claim 16, wherein if it is determined that the certain device selected to be the temporary master device is not a current master, transferring a role of master from a master device to the temporary master device through master-slave switching.

* * * * *